United States Patent [19]

Howerton

[11] Patent Number: 4,642,076
[45] Date of Patent: * Feb. 10, 1987

[54] BELT CONSTRUCTION CLIP FOR A TRANSVERSE BELT ELEMENT THEREFOR AND METHOD OF MAKING THE SAME

[75] Inventor: Anderson W. Howerton, Christian County, Mo.

[73] Assignee: Dayco Corporation, Dayton, Ohio

[*] Notice: The portion of the term of this patent subsequent to Nov. 12, 2002 has been disclaimed.

[21] Appl. No.: 768,371

[22] Filed: Aug. 22, 1985

Related U.S. Application Data

[62] Division of Ser. No. 575,434, Jan. 30, 1984, Pat. No. 4,552,550.

[51] Int. Cl.$^4$ .............................................. F16G 1/22
[52] U.S. Cl. .................................... 474/201; 474/242
[58] Field of Search ................ 474/242, 244, 201, 265

[56] References Cited

U.S. PATENT DOCUMENTS

| | | | |
|---|---|---|---|
| 1,500,458 | 7/1924 | Keen | 474/242 |
| 3,808,901 | 5/1974 | Berg | 474/242 |
| 4,080,841 | 3/1978 | Vollers | 474/201 |
| 4,177,687 | 12/1979 | Russ, Sr. | 474/242 |
| 4,193,312 | 3/1980 | Cicognani | 474/242 |
| 4,313,730 | 2/1982 | Cole, Jr. et al. | 474/201 |
| 4,457,742 | 7/1984 | Hattori et al. | 474/242 |

Primary Examiner—James A. Leppink
Assistant Examiner—Thuy M. Bui
Attorney, Agent, or Firm—Joseph V. Tassone

[57] ABSTRACT

An endless power transmission belt construction and a clip for a transverse belt element therefor as well as methods of making the same are provided, the belt construction comprising an endless flexible carrier that has a longitudinal axis and a plurality of transverse belt elements assembled on the carrier. Each belt element comprises a plurality of parts secured together to define an opening passing transversely therethrough and receiving the carrier therein. One of the parts of each belt element comprises a generally C-shaped clip that in a direction substantially transverse to the longitudinal axis of the carrier snaps over and substantially encircles and holds the remaining parts of the respective belt element in their assembled relation.

18 Claims, 11 Drawing Figures

4,642,076

BELT CONSTRUCTION CLIP FOR A TRANSVERSE BELT ELEMENT THEREFOR AND METHOD OF MAKING THE SAME

CROSS REFERENCE TO RELATED APPLICATION

This application is a divisional patent application of its copending parent patent application, Ser. No. 575,434, filed Jan. 30, 1984, now U.S. Pat. No. 4,552,550.

BACKGROUND OF THE INVENTION

1. Field of the Invention

This invention relates to an improved endless power transmission belt construction and to a transverse belt element therefor as well as to a method of making such a belt construction.

2. Prior Art Statement

It is known to provide an endless power transmission belt construction comprising an endless flexible carrier means and a plurality of transverse belt elements assembled on the carrier means, each belt element comprising a plurality of parts secured together to define opening means passing transversely therethrough and receiving the carrier means therein. For example, see Vollers, U.S. Pat. No. 4,080,841; Russ, Sr., U.S. Pat. No. 4,177,687; Cole, Jr., et al, U.S. Pat. No. 4,313,730; the Swiss Pat. No. 256,918 and the copending U.S. patent application of Carl A. Stiles, Ser. No. 562,551, filed Dec. 19, 1983.

It is also known to provide a metal clip that surrounds a toothed belt construction so as to form a plurality of transverse belt elements thereon. For example, see Cicognani, U.S. Pat. No. 4,193,312.

SUMMARY OF THE INVENTION

It is one feature of this invention to provide an improved endless power transmission belt construction which is particularly adapted to be utilized for continuously variable transmission purposes and the like.

In particular, it is believed according to the teachings of this invention that each transverse belt element for such an endless power transmission belt construction can have a plurality of parts which can be assembled on the flexible carrier means of the belt construction in such a unique manner that one of the parts of each belt element can be snap-fitted over the remaining parts thereof to hold all of the parts of that belt element in their assembled relation on the carrier means.

For example, one embodiment of this invention provides an endless power transmission belt construction comprising an endless flexible carrier means that has a longitudinal axis, and a plurality of transverse belt elements assembled on the carrier means, each belt element comprising a plurality of parts secured together to define opening means passing transversely therethrough and receiving the carrier means therein. One of the parts of each belt element comprises a generally C-shaped clip that in a direction substantially transverse to the longitudinal axis of the carrier means snaps over and substantially encircles and holds the remaining parts of the respective belt element in their assembled relation.

Accordingly, it is an object of this invention to provide an improved power transmission belt construction having one or more of the novel features of this invention as set forth above or hereinafter shown or described.

Another object of this invention is to provide an improved method of making such a power transmission belt construction, the method of this invention having one or more of the novel features of this invention as set forth above or hereinafter shown or described.

Another object of this invention is to provide an improved clip for a transverse belt element for such a power transmission belt construction or the like, the clip of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
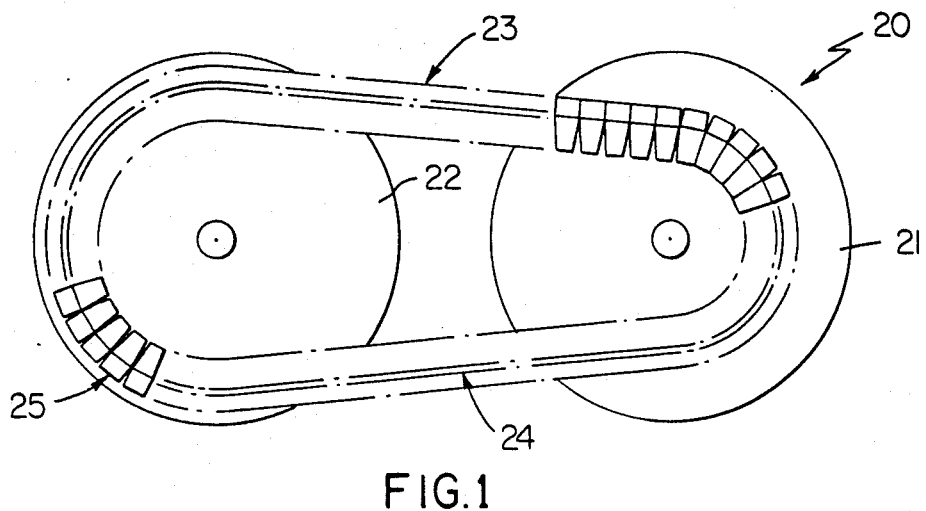
FIG. 1 is a schematic side view of a transmission means that includes the improved endless power transmission belt construction of this invention.

While the various features of this invention are hereinafter illustrated and described as providing an endless power transmission belt construction particularly adapted to be utilized for continuously variable transmission purposes, it is to be understood that the various features of this invention can be utilized singly or in any combination thereof to provide a belt construction for other uses as desired.

Therefore, this invention is not to be limited to only the embodiments illustrated in the drawings, because the drawings are merely utilized to illustrate one of the wide variety of uses of this invention.

Referring now to FIG. 1, a conventional continuously variable transmission arrangement is generally indicated by the reference numeral 20 and comprises a pair of rotatable pulleys 21 and 22, one of which is to be driven by the other thereof by means of an endless power transmission belt construction of this invention that is generally indicated by the reference numeral 23 and which operates in a manner conventional in the art. The pulleys 21 and 22 have variable diameters in a manner well known in the art whereby a continuously variable transmission is provided by the arrangement 20 in a manner well known in the art and as set forth in Vollers, U.S. Pat. No. 4,080,841; Cole, Jr., et al, U.S. Pat. No. 4,313,730 and the Swiss Pat. No. 256,918 whereby these two U.S. patents and this Swiss patent are being incorporated into this disclosure by this reference thereto.

Since the operation of a continuously variable power transmission arrangement is well known in the art, a further description of the arrangement 20 need not be set forth as the features of this invention are directed to the endless power transmission belt 23 and will now be described.

The endless power transmission belt construction 23 of this invention comprises an endless carrier means that is generally indicated by the reference numeral 24 and a plurality of transverse belt elements that are generally indicated by the reference numeral 25 and are carried by the carrier means 24 in a manner hereinafter set forth, the carrier means 24 comprising a plurality of substantially cylindrical bands 26 formed in a manner hereinafter set forth.

Each transverse belt element 25 of this invention defines a substantially trapezoidal configuration when viewed in the manner illustrated in FIG. 4, each belt element 25 comprising three parts 27, 28 and 29 adapted to be assembled together on the carrier means 24 in a manner hereinafter set forth by the part 27 snap-fitting around the parts 28 and 29 to hold the parts 27, 28 and 29 in their assembled relation on the carrier means 27.

In particular, the part 27 comprises a generally C-shaped clip or shell having opposed hooking ends 30 for a purpose hereinafter set forth. The clip 27 can be formed of any suitable material, such as metallic material and can be coated on the exterior thereof with a durable polymeric material as the opposed sides 31 thereof will engage against the faces of the pulleys 21 and 22 whereby the clip 27 for each belt element 25 performs a dual function, namely, fastens the parts 27, 28 and 29 together and provides the wear surface means 31 for the resulting belt element 25.

The clip or shell 27 has opposed side edges 32 extending along the same for a purpose hereinafter set forth, the side edge 32 being suitably slit at the elbows of the clip to permit the legs 31 and hooking ends to perform a snap-fit function as hereinafter described.

The parts 28 and 29 of each belt element 25 respectively comprise an outer block 28 and an inner block 29 formed from any suitable material, such as polymeric material, metallic material or combinations of material as desired, each block 28 and 29 having a peripheral edge surface 33 and opposed substantially flat front and rear surfaces 34 and 35 or 35 and 34 depending upon the direction of movement of the belt construction 23 as will be apparent hereinafter.

Figure 5:
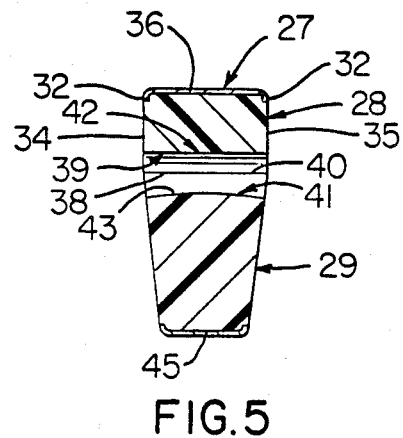
FIG. 5 is a cross-sectional view taken on line 5—5 of FIG. 4.

The front and rear surfaces 34 and 35 of the outer block 28 of each belt element 25 are disposed substantially parallel to each other while the front and rear surfaces 34 and 35 of the inner block 29 of the respective belt element converge toward each other as the surfaces 34 and 35 extend away from the other block 28 as illustrated in FIG. 5.

The peripheral edge surface 33 of the outer block 28 of each belt element 25 has a substantially flat outer surface section 36 joining with angled substantially flat side surface sections 37 by arcuate surface sections 36' as illustrated, the surface sections 37 converging toward each other as the surfaces 37 join with a substantially flat inner surface section 38 that is interrupted by a plurality of recesses 39 which define substantially semi-circular channels for a purpose hereinafter described.

Figure 4:
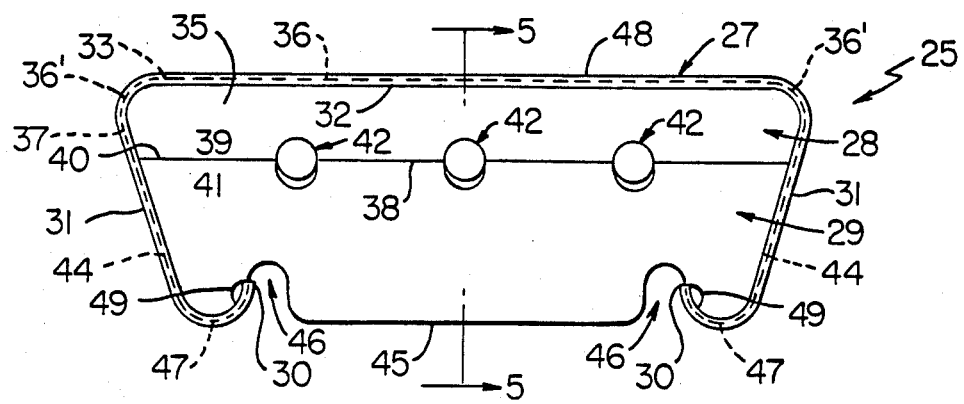
FIG. 4 is an enlarged side view of one of the belt elements of this invention and is taken on line 4—4 of FIG. 3 with the carrier means removed therefrom.

The lower block 29 of each belt element 25 has the peripheral surface 33 provided with a substantially flat top surface section 40 that is interrupted by a plurality of recesses 41 which are generally semi-circular in cross section and are adapted to mate with the recesses 39 in the upper part 28 when the two are placed together in the manner illustrated in FIG. 4 with the surface section 40 against the surface section 38 to define a plurality of openings 42 between the assembled parts 28 and 29 as illustrated in FIG. 5. However, the recesses 41 in the lower block 29 also define inner surfaces 43 in the lower block 29 which are substantially arcuate as illustrated in FIG. 5 to accommodate the bending of the carrier means 24 around the minimum effective diameter of the pulleys 21 and 22 for a purpose well known in the art.

The peripheral edge surface means 33 of each lower block 29 of each belt element 25 has opposed substantially flat side surface sections 44 that converge toward each other as they extend away from the surface section 40 and join with a lower substantially flat surface section 45 that is interrupted by a pair of recesses 46 that respectively define arcuate surface sections 47 adjacent the side surface sections 44 and recesses 46 as illustrated in FIG. 4 to respectively receive the hooking ends 30 of the respective clip 27 when the parts 27, 28 and 29 are assembled together in a manner hereinafter set forth. The side surface sections 44 of the lower block 29 complement the side surface sections 37 of an upper block 28 so as to be covered by the sides 31 of the clip 27 in the manner illustrated in FIG. 4 while the clip 27 has an upper substantially flat surface section 48 mating with the surface section 36 of the upper block 28 in the manner illustrated in FIG. 4.

While each recess 46 in the end surface section 45 of the lower block 29 of each belt element 25 defines a substantially smooth concave surface 48', each recess 46 also defines a small side opening 49 for a purpose hereinafter set forth.

Therefore, it can be seen that the parts 27, 28 and 29 of each belt element 25 of this invention can be formed in a relatively simple manner from desired materials to make the belt construction 23 of this invention in a manner now to be described.

Each belt element 25 is assembled to the cylindrical bands 26 of the carrier means 24 by first disposing the outer and inner blocks 28 and 29 around the bands 26 so that the bands 26 will be respectively received in the resulting openings 42 as the surface sections 40 and 38 are brought together. Thereafter, the part or clip 27 is disposed over the part 28 and the hooking ends 30 thereof are spread apart and uncurled so as to cause the hooking ends 30 to pass over the opposed sides 37, 44 of the assembled blocks 28 and 29 until the ends 30 hook in snap-fitting manner around the rounded parts 47 of the lower block 29 to be received into the recesses 46 as illustrated in FIGS. 3 and 4. In this manner, it is believed that the clips 27 can be utilized to snap-fit the parts 28 and 29 together onto the carrier means 24 to complete the belt construction 23 in the manner illustrated in FIGS. 1-3.

However, should it be necessary to replace a belt element 25 on the carrier means 24 or one or more parts 27, 28 and 29 thereof, it can be seen that a suitable tool could be inserted in the uncovered part of the openings 49 in the lower block 29 as illustrated in FIG. 4 to pry the hooking ends 30 of the clip 27 out of the recesses 46 to remove the clip 27 and, thus, the parts 28 and 29 from the carrier means 24. The removed clip 27 can then be utilized to form a new belt element 25 if the removed clip 27 was not the reason for changing the removed belt element 25.

When the C-shaped clip 27 is snap-fit over the parts 28 and 29 in the manner previously described, it can be seen that the small side edges 32 of the clip 27 engage against the front and rear faces 34 and 35 of the blocks 28 and 29 so as to hold the same in the configuration as illustrated in FIG. 5 and thereby prevent sliding movement between the blocks 28 and 29 in a direction along the carrier means 24.

Figure 2:
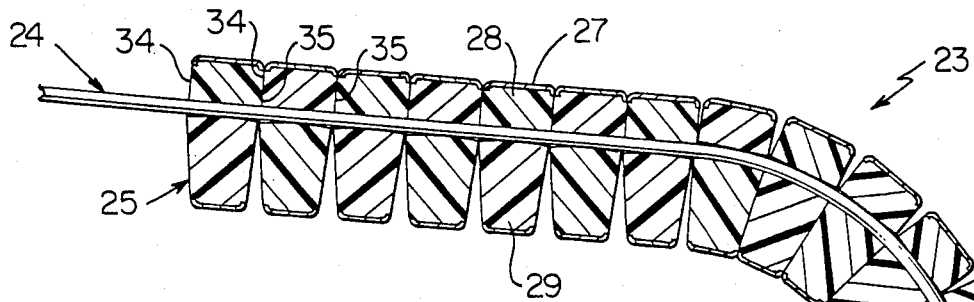
FIG. 2 is an enlarged cross-sectional view of a portion of the endless power transmission belt construction of FIG. 1.
Figure 3:
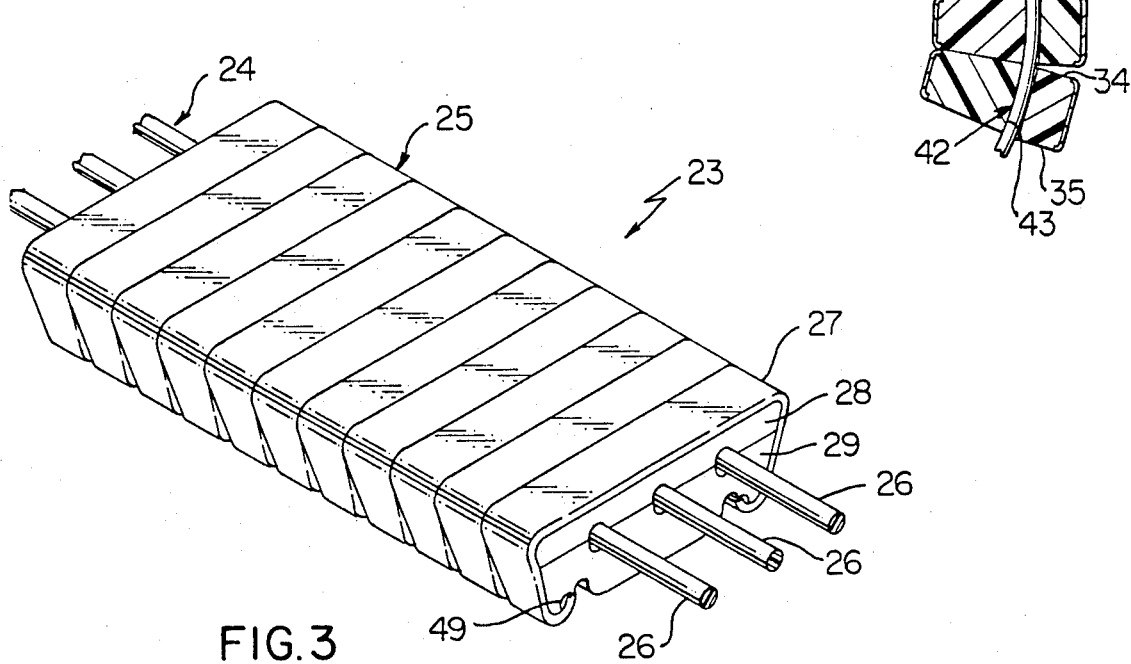
FIG. 3 is a fragmentary top perspective view of part of the belt construction of FIG. 2.

While each belt element 25 of this invention can have any suitable size and configuration, it is believed that the same can be a bidirectional pusher type transverse belt element as the front and rear sides 34 and 35 of the blocks 28, and 29 are substantially the same so that it can be seen in FIG. 2 that the belt construction 23 can move in either a clockwise direction or counterclockwise direction as the belt elements 25 will function in the same manner on the carrier means 24.

The blocks 28 and 29 of the belt elements 25 can be formed of a relative size so that the carrier means 24 is located approximately one-third of the distance from the outside surface of each belt element 25 whereby the blocks 28 would each have a height of approximately one-half of the height of each of the lower blocks 29. Also, the overall size of each belt element 25 could be approximately 1.0 inch high, 0.50 of an inch thick and 1.0 to 2.0 inches wide with the angled faces 34 and 35 on each lower block 29 defining an included angle to allow contact for pushing of the belt elements 25 as the belt construction 23 travels around the pulley as illustrated in FIG. 2.

As previously stated, to reduce bending stresses in the carrier means 24, the surfaces 43 in the respective openings 42 are radiused below the center lines of the openings 42 to conform to the minimum operating bending radius as illustrated in FIG. 2.

While the substantially cylindrical bands 26 of the carrier means 24 could be formed of any suitable structure and in any suitable manner, the same can comprise a round metallic wire rope that has been coated with polymeric material to minimize chafing and abrasion of mating surfaces of the carrier means 24 with the belt elements 25.

Figure 7:
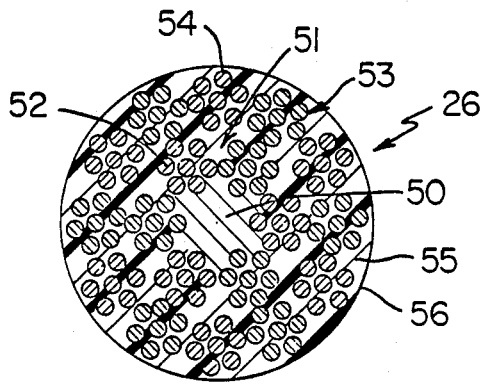
FIG. 7 is an enlarged cross-sectional view of one of the carrier means of the belt construction of FIGS. 1-4.

For example, reference is now made to FIG. 7 wherein one of the bands 26 is illustrated in cross section and comprises a central core member 50 formed of fiber, metal or other suitable material and having six strands 51 of seven metal wires 52 each laid in left Lang lay over the core 50 together with an outer layer of twelve strands 53 of seven metal wires 54 each laid in a right regular lay whereby the resulting band 26 is of the non-rotating type. When making the band 26 to be endless, the opposed ends of the band 26 could be woven or welded together by conduction in a manner to minimize a "stiff" section in the resulting rope or band 26.

As previously stated, the band 26 could have the wires 52 and 54 impregnated with a suitable polymeric material that is indicated by the reference numeral 55 in FIG. 7 so as to form a generally circular outer peripheral surface 56 that would minimize chafing and abrasion of the band 26 against the belt elements 25 as is well known in the art.

The number of bands 26 for the belt construction 23 as well as the diameter of each band 26 would depend on the tensile strength required for the carrier means 24 for the particular application of the belt construction 23.

While the carrier means 24 for the belt construction 23 has been illustrated as comprising a plurality of bands 26, it is to be understood that the same could comprise a single flat band member or a plurality of flat band members disposed in stacked relation in a manner conventional in the art.

Figure 11:
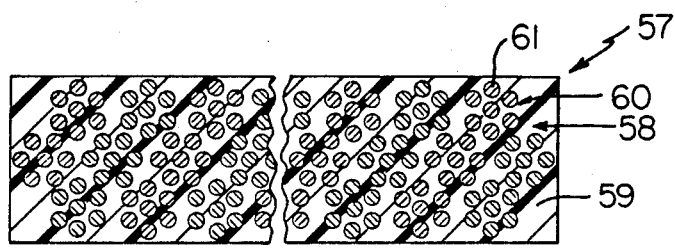
FIG. 11 is an enlarged cross-sectional view of the carrier means of the belt construction of FIG. 8.

For example, reference is now made to FIG. 11 wherein another carrier means of this invention is generally indicated by the reference numeral 57 and has a substantially rectangular cross-sectional configuration and is formed from a flat wire rope 58 that is impregnated with a polymeric material 59 to form the substantially rectangular configuration.

For example, the flat wire rope 58 can comprise a number of four-strand rope units 60 placed side-by-side and stitched together with soft steel sewing wire (not shown), each wire unit 60 comprising a plurality of metal wires 61 as illustrated.

Figure 8:
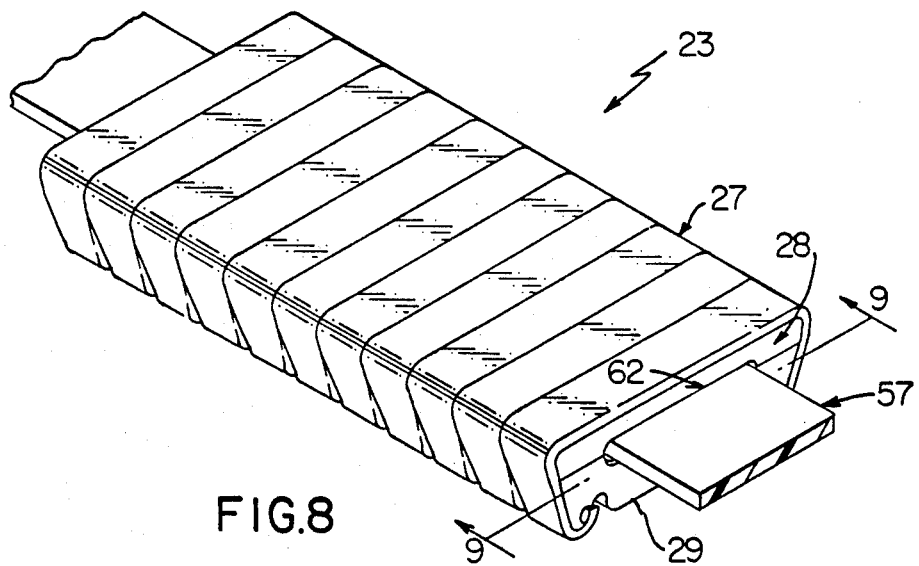
FIG. 8 is a fragmentary top perspective view of part of another belt construction of this invention.
Figure 9:
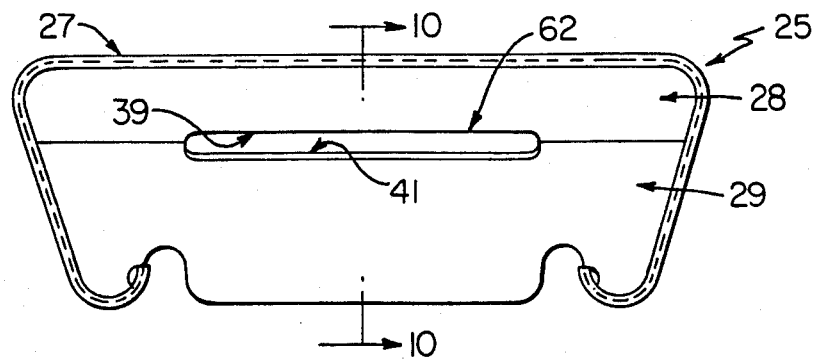
FIG. 9 is an enlarged side view of one of the belt elements of the belt construction of FIG. 8 and is taken in the direction of the line 9—9 thereof with the carrier means removed.
Figure 10:
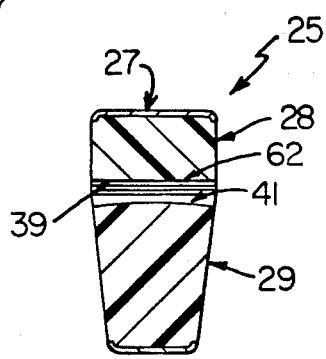
FIG. 10 is a cross-sectional view taken on line 10—10 of FIG. 9.
Figure 6:
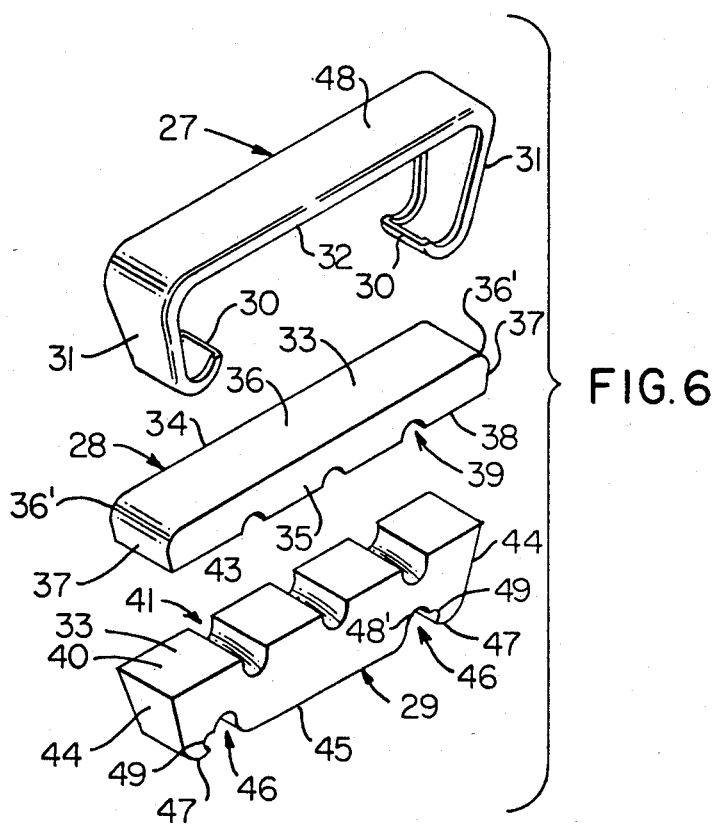
FIG. 6 is a reduced exploded perspective view of the parts of the belt element of FIG. 4.

In any event, the recess means 39 and 41 respectively for the blocks 28 and 29 could be changed from the multiple arrangement illustrated in FIGS. 1–6 to form a single elongated flat opening that is generally indicated by the reference numeral 62 in FIGS. 8, 9 and 10 to accommodate the substantially flat carrier band 57 illustrated in FIGS. 8 and 11 or other carrier means as desired.

Thus, since the parts of the belt elements illustrated in FIGS. 8, 9 and 10 are substantially the same as the belt elements 25 previously described, like reference numerals are being utilized for the belt construction and belt elements illustrated in FIGS. 8, 9 and 10 as the same functions and is formed in the same manner as the belt construction 23 previously described except for the resulting shape of the opening means thereof for the carrier means 57.

Accordingly, it can be seen that the blocks 28 and 29 can be modified in a simple manner to permit the use of various types of carrier means as desired. In fact, it is believed that the belt elements 25 of this invention could be fixed in any suitable manner to any suitable carrier means so as to be carried thereby rather than be of the pusher type previously described.

In view of the above, it can be seen that this invention not only provides an improved endless power transmission belt construction and method of making the same, but also this invention provides an improved clip for a transverse belt element for such an endless power transmission belt construction.

While the forms and methods of this invention now preferred have been illustrated and described as required by the Patent Statute, it is to be understood that other forms and method steps can be utilized and still fall within the scope of the appended claims.

What is claimed is:

1. In a clip for a transverse belt element for an endless power transmission belt construction having an endless flexible carrier means that has a longitudinal axis and a plurality of said transverse belt elements assembled thereon, said belt element comprising a plurality of parts secured together to define opening means passing transversely therethrough for receiving said carrier means therein, the improvement wherein said clip comprises one of said parts of said belt element and comprises a generally C-shaped clip that in a direction substantially transverse to said longitudinal axis of said carrier means is adapted to snap over and hold the remaining parts of said belt element in their assembled relation.

2. A clip for a belt element as set forth in claim 1 wherein said remaining parts of said belt element each has opposed front and rear surfaces and a peripheral edge surface therebetween, said clip being adapted to engage said peripheral edge surface of each said remaining part of said belt element.

3. A clip for a belt element as set forth in claim 2 wherein one of said remaining parts of said belt element has a pair of spaced apart recesses in said peripheral edge surface thereof, said clip having opposed hooking ends respectively being adapted to hook into said recesses of said one remaining part of said belt element.

4. A clip for a belt element as set forth in claim 2 wherein said clip has opposed side edge portions that are adapted to engage against said opposed front and rear surfaces of said remaining parts of said belt element.

5. A clip for a belt element as set forth in claim 1 wherein said clip is adapted to define the wear surfaces of said belt element and thereby provide a dual function.

6. A clip for a belt element as set forth in claim 1 wherein said clip has a generally trapezoidal configuration when viewing the same in a direction that is substantially along said longitudinal axis of said carrier means.

7. A clip for a belt element as set forth in claim 6 wherein said clip has the larger base of said trapezoidal configuration thereof defining a substantially flat structure.

8. A clip for a belt element as set forth in claim 7 wherein said clip has the angled sides of said trapezoidal configuration thereof each defining a substantially flat structure.

9. A clip for a belt element as set forth in claim 8 wherein said clip has the smaller base of said trapezoidal configuration thereof defining the opening in the C-stage thereof.

10. In a method of making a clip for a transverse belt element for an endless power transmission belt construction having an endless flexible carrier means that has a longitudinal axis and a plurality of said transverse belt elements assembled thereon with each said belt element comprising a plurality of parts secured together to define opening means passing transversely therethrough for receiving said carrier means therein, the improvement comprising the step of forming said clip to comprise one of said parts of said belt element and to comprise a generally C-shaped clip that in a direction substantially transverse to said longitudinal axis of said carrier means is adapted to snap over and hold the remaining parts of said belt element in their assembled relation.

11. A method of making a clip for a belt element as set forth in claim 10 wherein said remaining parts of said belt element each has opposed front and rear surfaces and a peripheral edge surface therebetween and including the step of forming said clip to be adapted to engage said peripheral edge surface of each said remaining part of said belt element.

12. A method of making a clip for a belt element as set forth in claim 11 wherein one of said remaining parts of said belt element has a pair of spaced apart recesses in said peripheral edge surface thereof and including the step of forming said clip to have opposed hooking ends respectively being adapted to hook into said recesses of said one remaining part of said belt element.

13. A method of making a clip for a belt element as set forth in claim 11 and including the step of forming said clip to have opposed side edge portions that are adapted to engage against said opposed front and rear surfaces of said remaining parts of said belt element.

14. A method of making a clip for a belt element as set forth in claim 10 and including the step of forming said clip to be adapted to define the wear surfaces of said belt element and thereby provide a dual function.

15. A method of making a clip for a belt element as set forth in claim 10 wherein the step of forming said clip causes said clip to have a generally trapezoidal configuration when viewing the same in a direction that is substantially along said longitudinal axis of said carrier means.

16. A method of making a clip for a belt element as set forth in claim 15 wherein the step of forming said clip causes the clip to have the larger base of said trapezoidal configuration thereof defining a substantially flat structure.

17. A method of making a clip for a belt element as set forth in claim 16 wherein the step of forming said clip causes said clip to have the angled sides of said trapezoidal configuration thereof each defining a substantially flat structure.

18. A method of making a clip for a belt element as set forth in claim 17 wherein the step of forming said clip causes said clip to have the smaller base of said trapezoidal configuration thereof define the opening in the C-shape thereof.

* * * * *